Nov. 10, 1970 R. J. ZOLLINGER 3,539,830

SWITCHING CIRCUIT PARTICULARLY FOR OPERATION IN RESPONSE TO VARIATIONS IN RESISTIVITY OF AT LEAST ONE SENSOR RESISTOR

Filed Aug. 8, 1966 2 Sheets-Sheet 1

United States Patent Office 3,539,830
Patented Nov. 10, 1970

3,539,830

SWITCHING CIRCUIT PARTICULARLY FOR OPERATION IN RESPONSE TO VARIATIONS IN RESISTIVITY OF AT LEAST ONE SENSOR RESISTOR

Richard J. Zollinger, Sierra Madre, Calif., assignor, by mesne assignments, to Whittaker Corporation, Los Angeles, Calif.

Filed Aug. 8, 1966, Ser. No. 570,994
Int. Cl. H03k *5/20;* G01n *27/00*
U.S. Cl. 307—235 7 Claims

ABSTRACT OF THE DISCLOSURE

The circuit disclosed includes a voltage regulator connected for powering a pair of strain gauges from which a voltage is fed to one side of a differential amplifier. The other side of the differential amplifier receives a reference voltage, as well as a positive feedback from the output of the differential amplifier for snap action without changing the reference level. The output of the differential amplifier controls current through an A-C or D-C load. The reference voltage is produced in the regulator so that variations reflect on both inputs of the differential amplifier.

In general, the present invention relates to a solid state switch circuit, having a small size and light weight and formed completely of solid state components with an easily varied "dead band." As used herein, the term "dead band" refers to the potential difference between "on" state of the switch circuit and the "off" state of the switch circuit. More specifically, the present invention relates to a bistable switch circuit adapted to control current flow in a load circuit and to conduct or not conduct current depending on the resistance of at least one sensor resistor.

Conventionally, the control of current flow in an electric circuit is done by a mechanical switch which is actuated by mechanical means. However, the usual mechanical switch has a relatively large size and heavy weight, and is susceptible to shock and vibration because of its moving parts. In addition, the switching contacts of a mechanical switch are subject to arcing and the difference in the actuating force between its "on" and "off" states, if adjustable, usually requires relatively complex arrangements for such adjustment. Because of the disadvantages of the usual mechanical switch, a variety of electrical switching circuits have been designed, such as the Schmitt trigger circuit and the conventional flip-flop circuit. However, such circuits are relatively complex and frequently have problems relating to accuracy and repeatability, as well as to rapid and positive switching.

Consequently, an object of the present invention is a switching circuit having all solid state components and a minimum number of components, so that light weight, small size are achieved and arcing problems are eliminated.

Another object of the present invention is a switching circuit which is completely immune to vibration and shock with an easily varied "dead band."

Still another object of the present invention is a switching circuit having excellent accuracy and repeatability as well as exhibiting rapid and positive switching of the load current.

Still another object of the present invention is a switching circuit which is adapted to conduct or not to conduct current depending on the resistance of at least one sensor resistor therein.

Other objects and advantages of the present invention will be readily apparent from the following description and drawings which illustrate a preferred exemplary embodiment of the present invention.

In general, the present invention involves a bistable switch circuit comprising a potential divider means adapted to receive a selected stable potential difference and to set the potential at a selected point therein. The potential divider means includes at least one sensor resistor whose resistance change causes a corresponding change in said point potential. Adapted to receive said point potential is a switching means having an output terminal and adapted to supply or not supply current to said output terminal depending on the potential of said point. Also, the switch circuit includes amplifier means connected to the switching means output terminal with the amplifier means being adapted to control current flow in response to current of said switching means.

In order to facilitate understanding of the present invention, reference will now be made to the appended drawings of prefered specific embodiments of the present invention. Such drawings should not be construed as limiting the invention which is properly set forth in the claims.

Figure 1:
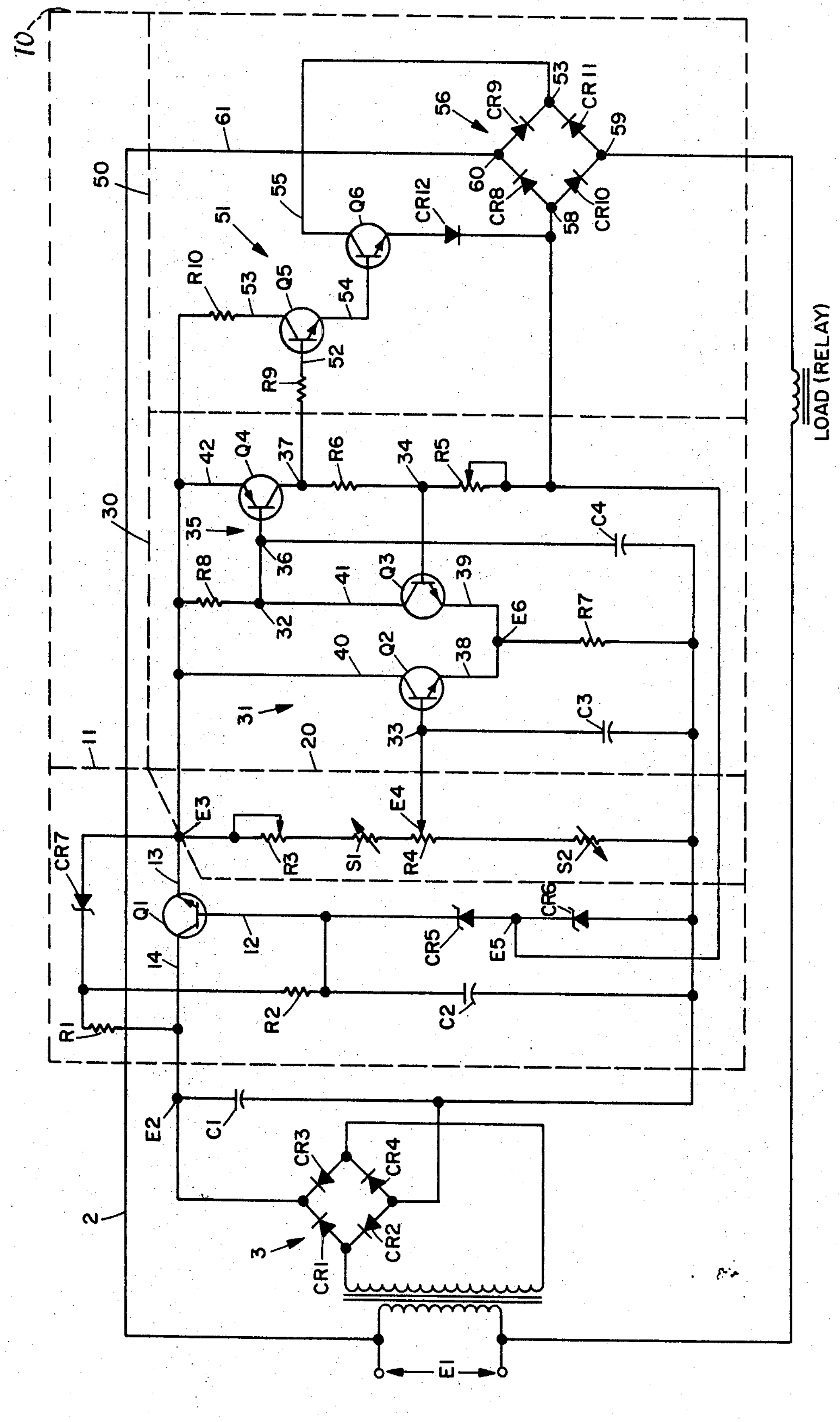
FIG. 1 is a schematic diagram of a specific embodiment of the switch circuit of the present invention.

As illustrated in FIG. 1, the switch circuit 10 receives a potential difference from a conventional power supply 2 which steps down an alternating current line potential E1 with a transformer T1 and then converts it to a direct current potential E2 by a diode bridge 3, including diodes CR1, CR2, CR3, and CR4, and a capacitor C1, across the output of the diode bridge 3.

The potential regulator means 11 receives the potential difference E2 and supplies a selected potential difference E3 to the potential divider means 20. The potential regulator means 11 comprises a transistor Q1 connected in series with the power supply 2 in an emitter follower configuration. Connected in series to the base terminal 12 of the transistor Q1 are Zener diodes CR5 and CR6. The emitter terminal 13 of the transistor Q1 is connected through a Zener diode CR7 to the collector terminal 14 through a first resistor R1 and to the base terminal 12 through a second resistor R2. The Zener diodes CR5 and CR6 have a capacitor C2 connected in parallel with them.

The operation of the potential regulator means 11 can be most easily understood with reference to the conventional potential regulator arrangement wherein a transistor is connected to an emitter follower configuration with a Zener diode connected to series to the base and the collector terminal is connected to the base terminal through a resistance. With such arrangement, the Zener diode maintains a substantially constant base voltage while the transistor increases such voltage stability to the emitter terminal. However, since the Zener diode has some dynamic impedence, a variation in the current through the Zener diode does cause some variation in the base voltage to the transistor. As shown in FIG. 1, a more constant current supply to the Zener diode is achieved by connecting the resistor R1 and Zener diode CR7 across the collector 14 and emitter 13 of the transistor Q1 and connecting the Zener diode CR7 to the base 12 of the transistor Q1. With such arrangement, a more constant voltage (and therefore a more constant current to the Zener diodes CR5 and CR6) is supplied to the base 12 of the transistor Q1.

Receiving the selected stable potential differences E3 from the potential regulator means 11 is a potential divider means 20 which is adapted to set the potential E4 at a selected point therein. The potential divider means 20 comprises in series a variable resistor R3, a sensor resistor S1, a potentiometer R4, and a sensor resistor S2. The sensor resistors S1 and S2 consist of a semiconductor strain gauges attached to a sensing element such as a cantilever beam so that bending of the beam causes a corresponding change in the resistance of the strain gauges. The variable resistor R3 permits adjustment of the potential drop across the potentiometer R4 and thus permits selection of the resistance values for the sensor resistors S1 and S2. The potentiometer R4, in turn, sets the potential at the selected point E4 for a given value of the sensor resistors S1 and S2. Consequently, a resistance change in the sensor resistors S1 and S2 causes a corresponding change in the point potential E4.

Receiving the point potential E4 is a switching means 30 having an output terminal 37 and adapted to supply or not supply current to the output terminal 37 depending on the potential. The switching means 30 includes a differential amplifier 31 connected across the potential divider means 20. The differential amplifier 31 has an output terminal 32 and has a first input terminal 33 connected to the point potential E4 and a second input terminal 34 connected through a variable resistor R5 is connected between the Zener diodes CR5 and CR6 in the potential regulator means 11 to obtain the set reference potential E5. The switching means 30 also includes a feedback amplifier means 35 having an input terminal 36 connected to the output terminal 32 of the differential amplifier and an output terminal 37 connected to the second input terminal 34 of the differential amplifier 30 through a resistor R6. The feedback amplifier 35 is adapted to substantially supply or not supply current to its output terminal 37 corresponding to an increase or decrease in current to the differential amplifier output terminal 32.

The differential amplifier 31 includes a pair of opposed transistors Q2 and Q3 of the n-p-n type wherein the base terminals are the first input terminal 33 and the second input terminal 34, respectively, of the differential amplifier 31. The emitter terminals 38 and 39 of the transistors Q2 and Q3, respectively, are connected together through a resistor R7 to the low potential side of the potential divider means 11. The collector terminals 40 and 41 of the transistors Q2 and Q3, respectively, are connected to the high potential side of the potential divider means 20. The collector terminal 41 of the transistor Q3 is connected directly to the output terminal 32 of the differential amplifier 30 and then is connected to the high potential side of the potential divider means 20 through the resistor R8. The first input terminal 33 of the differential amplifier 30 is connected directly to the low potential side of the potential divider means 20 through a capacitor C3.

The feedback amplifier 35 comprises a transistor Q4 of the p-n-p type with the base terminal being its input terminal 36 and its collector terminal being its output terminal 37. The emitter terminal 42 of the transistor Q4 is connected directly to the high potential side of the potential divider means 20. The base terminal 36 is connected to the low potential side of the potential divider means 20 through a capacitor C4.

The operation of the switching means 30 may be described by initially assuming the switching means 30 is in an off state, i.e., current is not being supplied to the output terminal 37. In such off state, the potential of the input terminal 33 (the base terminal of the transistor Q2) is substantially higher than the common emitter potential E6 which is substantially equal to the set reference potential E5. Such condition causes a major portion of the current flow for Q2 and Q3 to flow through Q2 with substantially no current through Q3 and thus no current through Q4. If, under such initial conditions, the potential E4 to the input terminal 33 decreases so that it approaches the potential of E6, the decrease in current through the transistor Q2 starts current flow through the transistor Q3. Such current flow through Q3 develops a potential drop across the resistor R8 so that the transistor Q4 begins to turn on. Current through transistor Q4 in turn develops a potential drop across the resistor R5, which makes the input terminal 34 (base terminal of transistor Q3) more positive and thus turns transistor Q3 on harder. The increased current flow through transistor Q3 in turn causes increased current flow through transistor Q4 so that both transistors turn on hard, substantially instantaneously, when the potential of E4 approaches the potential of E6 and the switching means 30 is turned on.

Once the switching means 30 is in the on state, i.e. current is supplied to the output terminal 37, it will remain in such state as long as the potential E4 to the input terminal 33 is substantially equal to the emitter potential E6. When the potential E4 is again increased, the transistor Q2 starts to turn on and draw current away from the transistor Q3. Reduced current through transistor Q3, in turn, reduces the current through the transistor Q4 because of the decreased potential drop across the resistor R8. Reduced current through transistor Q4 in turn causes a reduced current in the transistor Q3 because of the decreased potential drop across the resistor R5. Thus, when the transistor Q2 starts to turn on, the transistors Q3 and Q4 are substantially instantaneously turned off and the switching means 30 is turned back to its off state. In short, when the switching means is off, a decrease in the point potential E4 so that is approaches the emitter potential E6, i.e. substantially the set reference E5, causes the switching means 30 to turn on. Conversely, an increase in the point potential E4 turns the switching means 30 off. The change in the point potential E4 required to switch the switching means 30 is set by the variable resistor R5. Thus, an increase in the resistance R5 increases the change required in E4 to switch the switching means 30. Also, the capacitors C3 and C4 across the input terminal to the differential amplifier 31, and feedback amplifier 35, respectively, substantially prevent line disturbances such as voltage spikes from prematurely turning the switching means 30 on or off.

Connected to the switching means output terminal 37 is an amplifier means 50, which is adapted to control current flow in a load circuit 61 in response to the current from the switching means 30. The amplifier means 50 comprises a first amplifier stage 51, a second amplifier stage 55 and a diode bridge 56. The first amplifier stage 51 includes a transistor Q5 having its input terminal 52 (its base terminal) connected to the switching means output terminal 37 through a resistor R9. The output terminal 54 of the first amplifier stage 51 is the emitter terminal of the transistor Q5 and the collector terminal 53 of the transistor Q5 is connected to the high potential side of the potential divider means 20 through a resistor R10. The second amplifier stage 55 comprises a transistor Q6 with its input terminal (the base terminal of transistor Q6) connected directly to the output terminal 54 of the first amplifier stage 51. The collector terminal of the transistor Q6 is connected directly to the one output terminal 57 of the diode bridge 56 while the emitter terminal is connected through a diode CR12 to the other output terminal 58 of the diode bridge 56. The diode bridge 56 has input terminals 59 and 60 connected in series with an alternating load current from the power source E1 and includes a set of diodes CR8, CR9, CR10 and CR11 arranged so that for alternating current to flow in the load circuit it must flow through the transistor Q6 of the second amplifier stage 55 of the amplifier means 50. As illustrated, the load circuit 61 is adapted to actuate a relay when current flows therein.

In operation, the amplifier means 50 receives current from the output terminal 37 of the switching means 30 and amplifies such current in two steps by the first amplifying stage 51 and the second or final amplifying stage 55 so that the transistor Q6 of the second amplifying stage 55 is saturated and carries the load current of the load circuit 61 when current is supplied to the output terminal 37 of the switching means 30. In order for the transistor Q6 of the final amplifier stage 55 to control the alternating current in the load circuit 61, the diode bridge changes the load current to direct current through the transistor Q6. Thus, if the input terminal 60 is positive, the load current flows through diode CR9, the transistor Q6 and the diode CR10 in the proper direction through Q6. Conversely, when the input terminal 59 is positive, the load current flows through diode CR11, the transistor Q6 and the diode CR8 in the same direction.

Having described the construction and operations of each portion of the switching circuit 10, the overall operation of the switching circuit 10 may now be set forth. In a specific application of the switching circuit 10, a deflection of a beam is used to sense whether more than one sheet of paper is being fed to an office copying machine. Thus, if two or more sheets of paper are fed at one time, the beam is deflected, while if a single sheet of paper is fed the beam remains in its reference position. The sensors S1 and S2 are mounted on the beam and the variable resistance R3 and the potentiometer R4 are adjusted so that when the beam is in its reference position, the switching circuit is turned off. As set forth above, such condition exists when the set potential E4 of the potentiometer R4 is greater than the emitter potential E6 of the differential amplifier 30. Also, the sensor resistors S1 and S2 are mounted on the beam so that the deflection of the beam increases the resistance of S1 and decreases the resistance of S2. Such result may be achieved by having the sensor resistors both formed of p-type silicon and having the deflection of the beam put sensor resistor S1 in tension and the sensor resistor S2 in compression, or by having the sensor resistor S1 made of p-type silicon and the sensor resistor S2 of n-type silicon and have the deflection of the beam put both sensor resistors in tension. With such arrangement, it can be seen that the deflection of the beam will decrease the potential of E4 and turn the switching circuit on. As set forth above, when the switching circuit is off, i.e., the beam is in its reference position, the current does not flow in the load circuit and, consequently, the relay is not activated. However, when the switching circuit is on, i.e., the beam is deflected, current flows in the load circuit and the relay is thereby actuated. The relay may then be used to suitably control the operation of the copying machine when more than one sheet of paper is fed thereto, e.g., turn the copying machine off or about the two or more sheets of paper.

Figure 2:
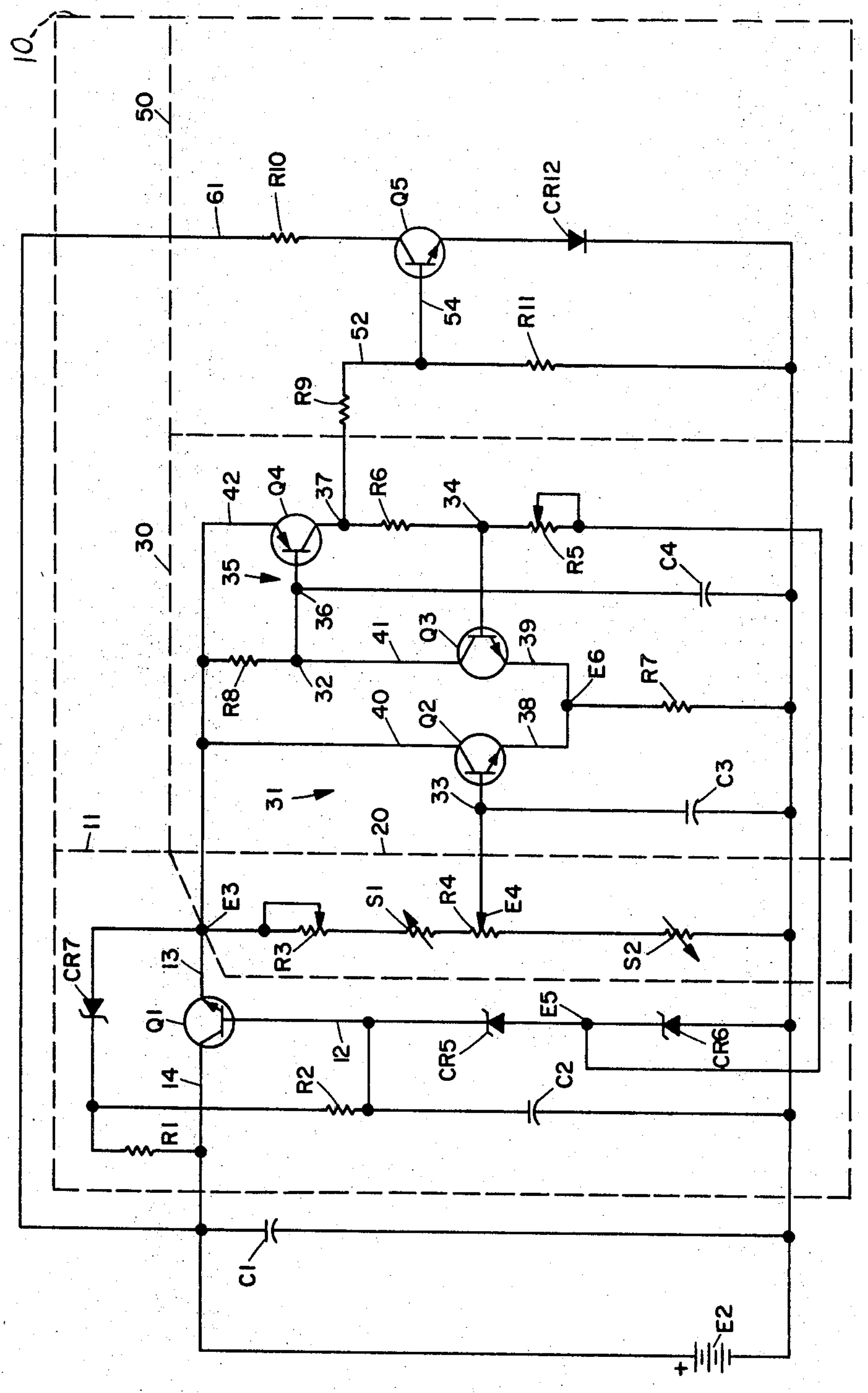
FIG. 2 is a schematic diagram of another specific embodiment of the switch circuit of the present invention.

Referring now to FIG. 2, another specific embodiment is illustrated which utilizes one direct current power source for both the switching circuit and the load circuit. In referring to FIG. 2, the reference characters used correspond with those in FIG. 1 and are consistent in that like items employ like reference characters in each figure. In FIG. 2 direct current potential E2 is suplied to the potential regulator means 11 which is constructed and operates as set forth above. Similarly, the stable potential difference E3 from the potential regulator means 11 is supplied to the potential divider means 20 which is constructed and operates as set forth above. Likewise, the point potential E4 from the potential divider means 20 is supplied to the switching means 30 which is constructed and operates as set forth above. Finally the switching means 30 output terminal 37 is connected to the amplifier means 50 which is adapted to control current flow in a load circuit 61 in response to the current from the switching means 30. In FIG. 2, the load circuit 61 is simply the branch of amplifier means 50 through the transistor Q5 with the resistor R10 being the load resistance.

The amplifier means 50 comprises a transistor Q5 having its input terminal 52 (its base terminal) connected to the switching means output terminal 37 through the resistor R9 and to the low potential side of the power source E2 through a resistor R11. In operation, the amplifier means 50 receives current from the output terminal 37 of the switching means 30 amplifies such current so that the transistor Q5 carries the load current of the load circuit when current is supplied to the output terminal 37.

Many other specific embodiments of the present invention will be obvious to one skilled in the art in view of this disclosure. For example, although the semiconductor strain gauges are preferred as the sensor resistors, other types of sensor resistors may be utilized as long as change in the variable being sensed produces a change in the resistance value of the resistor. Thus, the switching circuit may be actuated by pressure changes, temperature changes, loading changes and other types of strain gauges may be utilized. Also, as described, the present invention utilizes specific types of transistors in specific portions of the switching circuit and specific types of amplifiers; however, the opposite type of transistor may be utilized with corresponding changes in the circuit arrangement, e.g., p-n-p transistors may be utilized in the differential amplifier in the place of n-p-n transistors and, similarly, a common base differential amplifier may be used in place of the common differential amplifier shown. In addition, as shown, the switching circuit is utilized to switch altering load current. If it is desired to switch a direct current load, the diode bridge in the final stage of the amplifier means may be eliminated with the load current passing directly through the final amplifier stage, i.e., connected to the collector and emitter terminals. Also, where the load current is sufficiently small, the amplifier means utilize only a single stage of amplification.

There are many features in the present invention which clearly show the significant advance the present invention represents over the prior art. Consequently, only a few of the more outstanding features will be pointed out to illustrate the unexpected and unusual results attained by the present invention. One feature of the present invention is that by using all solid state components and by the particular arrangement of such components, a small size, light weight, switching circuit is obtained which is immuned to vibration and shock. Another feature of the present invention is that rapid and positive switching of the load current is obtained by using the feedback amplifier in conjunction with the differential amplifier as set forth above. Still another feature of the present invention is a switching circuit with the variable resistance which controls the dead-band range of the switching circuit, and permits an easy and quick adjustment of it and also permits excellent repeatability in the switching operation.

It will be understood that the foregoing description and example are only illustrative of the present invention and it is not intended that the invention be limited thereto. All substitutions, alterations, and modifications, of the present invention which come within the scope of the following claims or which the present invention is readily acceptable without departing from the spirit and scope of this disclosure are considered part of the present invention.

I claim:

1. A bistable switch circuit adapted to control current flow in a load circuit and to conduct or not conduct current depending on the resistance of at least one sensor resistor therein, comprising:

potential divider means adapted to receive a selected stable potential difference and to set the potential at a selected point therein, said potential divider means including at least one sensor resistor whose resistance change causes a corresponding change in said point potential;

potential regulator means adapted to receive a potential difference from a power supply, and connected to supply a selected stable potential difference to said potential divider means;

said potential regulator means comprising a transistor connected in series with said power supply, and one side of the divider means in an emitter follower configuration, at least two Zener diodes connected between the base of said transistor and the other side of said divider means, a further including a Zener diode connecting the emitter terminal of said transistor to the collector terminal through a first resistor and to the base terminal through a second resistor;

switching means having an input terminal connected to receive said point potential and to selectively provide or inhibit current to an output terminal, depending on the potential of said point; and amplifier means connected to said switching means output terminal, said amplifier means being adapted to control current flow in a load circuit in response to current from said switching means.

2. A switching circuit for operation in response to variations in resistivity of at least one sensor resistor, comprising:

first means including a voltage regulator connected to the sensor, the first means further including circuit means connected to the sensor resistor to provide a first voltage variable in response to variations of the resistance of the sensor resistor;

differential amplifier means having a pair of input terminals and an output terminal, one input terminal of the pair connected to the first means to receive the voltage as provided by the first means;

an output circuit including a feedback amplifier connected between the output and the other input terminal of the pair of the differential amplifier, to provide regeneratively operating positive feedback to the differential amplifier through the other input thereof;

second means connected to the voltage regulator to derive a reference voltage therefrom, and further connected to the other input of the differential amplifier to provide thereto the reference voltage, the second means being coupled to the voltage regulator so that variations in the voltage as effective at the other input of the differential amplifier reflect in a similar change in the first voltage as applied by the circuit means of the first means to the one input of the differential amplifier to feed thereto variations in voltage as effective in the other input of the differential amplifier, to be similarly effective in the one input terminal thereof through the voltage regulator so as to maintain the relation between effective reference and first voltage in the differential amplifier to be independent from the regenerative action by the feedback amplifier, so as to maintain thereby the response of the feedback amplifier dependent on a predetermined relation between the reference voltage and a particular resistance of the sensor resistor as reflected in the first voltage as provided by the circuit means of the first means; and output means connected to the output circuit to provide a first signal when the first voltage exceeds the value corresponding to the predetermined relation and a second signal when the first voltage is below that value.

3. A circuit as stated in claim 2, wherein said sensor resistor is a strain gauge.

4. A circuit as set forth in claim 2, the first means including at least one two-terminal, constant voltage element connected to the base electrode of a transistor having its emitted collector path connected in series with the sensor resistor, one terminal of the constant voltage element connected to the other input of the differential amplifier, the other terminal connected to the sensor resistor and to the one input of the differential amplifier for establishing reference potential in relation to which the first and reference voltages are taken.

5. A switching circuit as set forth in claim 2, the differential amplifier having a terminal in relation to which first and reference voltages are taken, the second means including means connecting the first to the second means so that variations of the reference voltage as effective on the other input terminal due to operation of the feedback means and relative to the terminal operates as similar variation in the first voltage.

6. A circuit as set forth in claim 2, the output means including a load circuit, a diode bridge having a pair of A-C terminals and a pair of D-C terminals, the load circuit being connected in series with the pair of A-C terminals, for connection to a source of A-C voltage supply, the output means further connecting the D-C terminals to the output circuit for selectively interconnecting and disconnecting the D-C terminals in respective response to one and the other of the first and second voltages.

7. A switching circuit for operation in response to variations in resistivity of at least one sensor resistor, comprising:

voltage regulator means connected to provide a predetermined essentially constant voltage;

first means connecting the voltage regulator means to the sensor resistor and including circuit means providing a first voltage variable in response to variations of the resistance of the sensor resistor;

differential amplifier means having a pair of input terminals and an output terminal, one input terminal of the pair connected to the first means to receive the voltage as provided by the first means;

an output circuit including a feedback amplifier connected between the output and the other input terminal of the pair of differential amplifier, to provide regeneratively operating positive feedback to the differential amplifier through the other input thereof;

second means connecting the other input of the differential amplifier to the first means to provide to the other input a reference voltage and to feed back variations in the reference voltage as effective in the differential amplifier and resulting from the regenerative action by the feedback to the first means, so as to maintain the relation between the reference voltage and the first voltage as provided by the first means independent from the operation of the feedback amplifier; and output means connected to the output circuit to provide a first signal when the first voltage exceeds the value corresponding to the predetermined relation and a second signal when the first voltage is below that value.

References Cited

UNITED STATES PATENTS

| | | | |
|---|---|---|---|
| 3,136,877 | 6/1964 | Heller | 307—235 XR |
| 3,300,689 | 1/1967 | Beddoes | 307—235 XR |
| 3,316,423 | 4/1967 | Hull | 307—235 XR |
| 2,866,909 | 12/1958 | Trousdale | 307—257 X |
| 3,155,840 | 11/1964 | Hoeschele | 328—146 X |

OTHER REFERENCES

"Force Transducer" by Stokes et al., in IBM Technical Disclosure Bulletin, vol. 7, No. 12 dated May 1965, pp. 1225–1226.

JOHN S. HEYMAN, Primary Examiner

S. D. MILLER, Assistant Examiner

U.S. Cl. X.R.

307—231, 257, 278, 297, 308; 328—1, 146, 150